United States Patent [19]

Koshman et al.

[11] 4,214,291
[45] Jul. 22, 1980

[54] EXPLOSION-PROOF SWITCHGEAR APPARATUS

[76] Inventors: Vitaly I. Koshman, bulvar Shevchenko, 123, kv. 25, Donetsk; Mikhail A. Nagorny, ulitsa Sotsialisticheskaya, 146, kv. 2, Makeevka, Donetskaya oblast; Vladimir F. Petrichenko, ulitsa Prozhektornaya, 6, kv. 44, Donetsk, all of U.S.S.R.

[21] Appl. No.: 973,564

[22] Filed: Dec. 27, 1978

[30] Foreign Application Priority Data

Jan. 10, 1978 [SU] U.S.S.R. .............................. 2569051

[51] Int. Cl.² ............................................. H02B 11/22
[52] U.S. Cl. .................................... 361/338; 361/340
[58] Field of Search ................. 200/50 AA; 361/335, 361/338, 339, 343, 340

[56] References Cited

U.S. PATENT DOCUMENTS

| 2,565,314 | 8/1951 | Lewis | 361/340 |
| 3,157,827 | 11/1964 | Tebben | 361/340 |
| 3,168,683 | 2/1965 | Brokaw | 361/338 |

Primary Examiner—Gerald P. Tolin
Attorney, Agent, or Firm—Lackenbach, Lilling & Siegel

[57] ABSTRACT

An explosion-proof switchgear apparatus comprises an enclosure housing a carriage mounted on a guide and coupled by a pivot pin to a chassis which accommodates electric devices and the movable part of a separable contact system whose fixed part is secured to the enclosure for interaction with the movable part. The apparatus includes a coupling unit mounted on the pivot pin and it is secured to the chassis whose opposite end has a vertical slot. The apparatus is also provided with a guiding retainer means installed at the same enclosure portion, where the fixed part of the separable contact system is mounted, and received into the vertical slot.

2 Claims, 4 Drawing Figures

EXPLOSION-PROOF SWITCHGEAR APPARATUS

FIELD OF THE INVENTION

The present invention relates to explosion-proof apparatus for switching the power, protection, and control circuits of electric installations and is specifically concerned with switchgear apparatus used in a dangerously explosive environment.

The invention may be utilized in developing starters, automatic feeder circuit breakers, and control stations.

BACKGROUND OF THE INVENTION

Safe operation of switchgear apparatus in a dangerously explosive production environment, for instance, in coal and ore mines, at enterprises of the mining-and-chemical industry, and petroleum and gas industries, is of prime importance.

The explosion protection of such switchgear apparatus is provided by an explosion-proof enclosure which is capable of withstanding the pressure of an explosion and preventing propagation of the explosion products into the surrounding atmosphere.

In prior art apparatus, the control, protection and switching electric devices are arranged on a removable panel mounted on special brackets in the explosion-proof enclosure; some of the devices are arranged on the panel face, and the rest of these, on the panel back.

However, practice has demonstrated that such an arrangement of the electric devices is inconvenient for various repair and preventive jobs whose accomplishment is hampered by a limited space within the enclosure. Moreover, inspecting the devices arranged on the panel back requires a complete dismounting of the panel, i.e. its removal from the brackets.

There is also known an explosion-proof switchgear (USSR Inventor's Certificate No. 212,351) which comprises an enclosure housing a carriage mounted on a guide and coupled by a pivot pin to a chassis. The enclosure is divided by a partition into two compartments, one of which houses the fixed part of a separable contact system, and the other, the chassis. The chassis carries electric devices, such as a contactor, control and protection units, and the movable part of the separable contact system. The contactor is mounted on the chassis side whereon the movable part of the separable contact system is arranged, and the control and protection units, are arranged on the reverse side of the chassis. The guide carrying the carriage is secured to the internal side wall of the enclosure.

The chassis is movable horizontally along the guides through the use of the carriage and pivotable around the pivot pin. In the working position, the chassis is inside the enclosure, providing for an electrical contact between the parts of the separable contact system. This affords free access only to those devices which are arranged on the chassis face, i.e. on the reverse side with respect to that whereon the movable part of the separable contact system is accommodated.

To gain access to the contactor for various repair and preventive jobs, the chassis has to be pulled out of the enclosure and rotated around the pivot pin, which requires an additional working space and is thus undesirable under limited space conditions, such as in mine workings.

Besides, the arrangement of the guides on a side wall inside the enclosure may over a period of time cause a misalignment of the separable contact system contacts and hence a deterioration of the electric contact therebetween.

Another disadvantage is that, because of an angular deflection of the contacts and the thermal deformation of the chassis, the construction of the above apparatus is incapable of ensuring adequate reliability of the electric contact.

SUMMARY OF THE INVENTION

It is an object of the present invention to provide an explosion-proof switch-gear apparatus to be used in a dangerously explosive environment, in which apparatus the chassis with the electrical devices mounted thereon is pivotable as well as vertically and horizontally movable within the enclosure in order to make the maintenance of the apparatus easier.

Another object of the invention is to provide for maintenance of the electric devices within the apparatus enclosure.

Yet another object of the invention is to enhance reliability of electric contact of a separable joint.

The above and other objects are attained by an explosion-proof switchgear apparatus comprising an enclosure housing a carriage mounted on a guide and being coupled by a pivot pin to a chassis accommodating electric devices and carrying the movable part of a separable contact system whose fixed part is secured to the enclosure for interaction with the movable part. The apparatus includes a coupling unit mounted on the pivot pin and it is secured to the chassis, whose opposite end has a vertical slot. The apparatus is also provided with a guiding retainer means installed at the same enclosure portion, where the fixed part of the separable contact system is mounted, and received into the vertical slot.

The coupling unit preferably comprises, according to the invention, a threaded cylinder secured to the chassis and a coupling nut mounted on the pivot pin and having a thread corresponding to the cylinder thread.

BRIEF DESCRIPTION OF THE DRAWINGS

The objects and advantages of the present invention will now be explained by the detailed description of an embodiment thereof with reference to the accompanying drawings, in which.

DETAILED DESCRIPTION OF THE PREFERRED EMBODIMENTS

Figure 1:
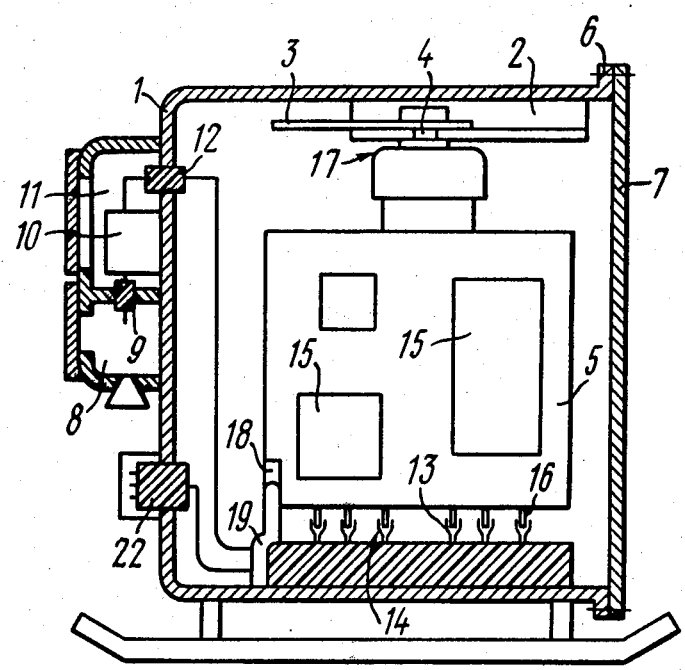
FIG. 1 is a sectional view of an explosion-proof switchgear apparatus according to the invention.

Referring to FIG. 1, the explosion-proof switchgear apparatus comprises an enclosure 1 which houses a carriage 3 mounted on a guide 2 and coupled by a pivot pin 4 with a chassis 5.

In the embodiment of the invention herein described, the enclosure 1 comprises a flange 6 and a cover 7 to ensure explosion protection, and it is also provided with an inlet box 8 for connecting the power feeder cables, which is accomplished with the aid of feedthrough clamps 9. An interlocking isolator 10 is arranged in a separate compartment 11 separated from the inlet box 8 by a partition and is electrically connected with the feedthrough clamps 9 of the inlet box 8 and, by means of feedthrough clamps 12, with a fixed part 13 of a separable contact system 14.

The chassis 5 serves to mount electric devices shown at 15 and comprises appropriate means for attachment and electrical connection thereof.

The chassis 5 may have the form of a cylinder or prism. It carries also a movable part 16 of the separable contact system.

The fixed part 13 of the separable contact system 14 is secured to the enclosure 1 for interaction with the movable part 16.

According to the invention, the apparatus comprises a coupling unit 17 which serves as a link between the pivot pin 4 and the chassis 5, the pivot pin 4 being mounted on the carriage 3.

The coupling unit 17 is mounted on the pivot pin 4 and is secured to the chassis 5 on the reverse side with respect to that whereon the movable part 16 of the separable contact system 14 is accommodated.

The chassis 5 has, according to the invention, a vertical slot 18 located at the chassis side whereon the movable part 16 of the separable contact system 14 is arranged.

According to the invention, the apparatus includes a guiding retainer means 19 intended to position the chassis 5 so as to ensure alignment of the parts 13 and 16 of the separable contact system 14 and, in addition, to provide for a vertical displacement of the chassis 5, precluding at the same time rotation of the latter around the pivot pin 4.

The retainer means 19 is installed at the same portion of the enclosure 1, whereon the fixed part 13 of the separable contact system 14 is mounted, and is received into the slot 18.

Figure 2:
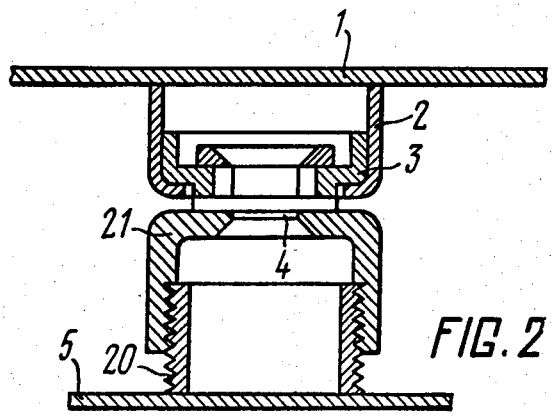
FIG. 2 is a sectional view of the coupling unit according to the invention.

In the preferred embodiment of the invention, the coupling unit 17 comprises a threaded cylinder 20 (FIG. 2) secured to the chassis 5 and a coupling nut 21 mounted on the pivot pin 4 and having a thread corresponding to that of the cylinder 20.

The outlet of the electric circuits from the switchgear apparatus is effected by means of a connector 22 (FIG. 1) connected to the fixed part 13 of the separable contact system 14.

Figure 3:
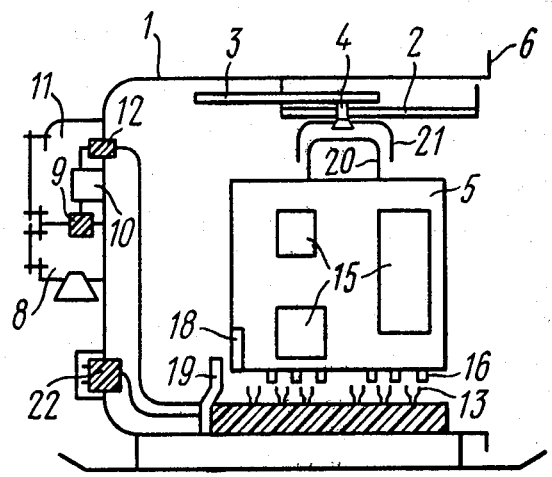
FIG. 3 is a schematic view of the apparatus in the disconnected position.

Such a construction of the explosion-proof switchgear apparatus makes it possible to carry out its repair as well as various preventive jobs within the enclosure 1. To accomplish this, first the power supply is disconnected by means of the interlocking isolator 10 and then the cover 7 is removed from the enclosure 1 (FIG. 3). Next, the nut 21 is rotated to lift the chassis 5; this disconnects the movable part 16 of the separable contact system 14 from the fixed part 13 thereof. When lifted, the chassis 5 with the electric devices 15 mounted thereon can be somewhat pulled out by moving the carriage 3 along the guide 2. The chassis 5 can also be rotated through any angle, which is effected by the pivot pin 4 mounted in the carriage 3 and joined to the coupling nut 21.

This affords a free access to any portion of the chassis 5 to be serviced.

Figure 4:
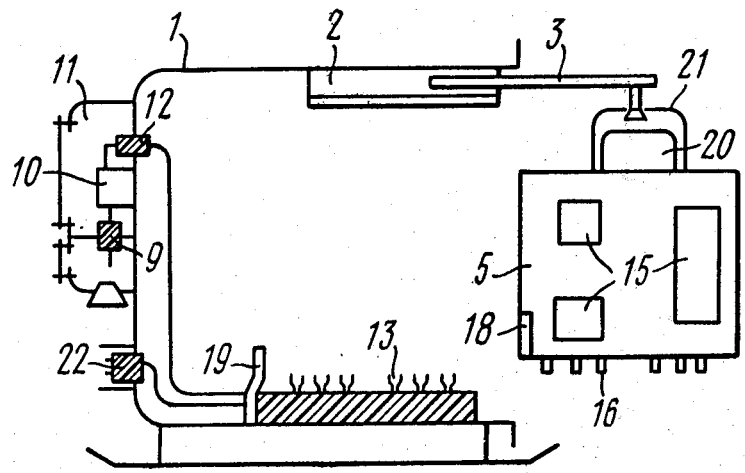
FIG. 4 is another schematic view of the apparatus with the chassis pulled out of the enclosure.

The chassis 5 can also be completely pulled out (FIG. 4) and disconnected from the enclosure 1.

The switchgear apparatus according to the invention enables repair and preventive jobs to be carried out within the enclosure.

The construction of the apparatus simplifies mounting the electric devices within the enclosure.

The apparatus affords a free access to the electric devices in carrying out repair and preventive jobs.

While particular embodiments of the invention have been shown and described, various modifications thereof will be apparent to those skilled in the art, and therefore it is not intended that the invention be limited to the disclosed embodiments or to the details thereof, and departures may be made therefrom within the spirit and scope of the invention as defined in the claims.

What we claim is:

1. An explosion-proof switchgear apparatus comprising:

an enclosure with a guide;
   a carriage mounted within the enclosure for travel along said guide;
   a pivot pin whereon said carriage is mounted;
   a separable contact system including: a movable part and a fixed part, said fixed part of said separable contact system being mounted within said enclosure on the side opposite to said guide;
   electric devices;
   a chassis to accommodate said electric devices, having a vertical slot;
   said movable part of said separable contact system, mounted on said chassis at the side thereof whereon said vertical slot is located;
   a guiding retainer means received into said vertical slot of said chassis;
   said guiding retainer means secured to the same side of said enclosure, whereon said fixed part of said separable contact system is arranged; and
   a coupling unit mounted on said pivot pin and secured to said chassis in the side thereof which is reverse to the side whereon said vertical slot is located.

2. An explosion-proof switchgear apparatus according to claim 1, wherein: said coupling unit having:
   a threaded cylinder and a coupling nut;
   said coupling nut threadingly engaging said threaded cylinder and mounted on said pivot pin; and
   said threaded cylinder being secured to said chassis.

* * * * *